US011799399B2

(12) United States Patent
Khmelnik et al.

(10) Patent No.: US 11,799,399 B2
(45) Date of Patent: Oct. 24, 2023

(54) DEVICE FOR CONVERTING ELECTROMAGNETIC MOMENTUM TO MECHANICAL MOMENTUM

(71) Applicants: Solomon Khmelnik, Bene-Ayish (IL); Vitaly Triger, Ashdod (IL)

(72) Inventors: Solomon Khmelnik, Bene-Ayish (IL); Vitaly Triger, Ashdod (IL)

(*) Notice: Subject to any disclaimer, the term of this patent is extended or adjusted under 35 U.S.C. 154(b) by 620 days.

(21) Appl. No.: 17/423,858

(22) PCT Filed: Jan. 22, 2019

(86) PCT No.: PCT/IL2019/050084
§ 371 (c)(1),
(2) Date: Jul. 17, 2021

(87) PCT Pub. No.: WO2019/145942
PCT Pub. Date: Aug. 1, 2019

(65) Prior Publication Data
US 2021/0376774 A1 Dec. 2, 2021

Related U.S. Application Data

(60) Provisional application No. 62/621,054, filed on Jan. 24, 2018.

(51) Int. Cl.
*B64G 1/40* (2006.01)
*H02N 11/00* (2006.01)
*F03H 99/00* (2009.01)

(52) U.S. Cl.
CPC ........... *H02N 11/006* (2013.01); *B64G 1/409* (2013.01); *F03H 99/00* (2013.01)

(58) Field of Classification Search
CPC ........ H02N 11/00; H02N 11/006; B64G 1/40; B64G 1/409; F03H 99/00
See application file for complete search history.

(56) References Cited

U.S. PATENT DOCUMENTS 1,974,483 A 2/1930 Brown
3,120,363 A 2/1964 Hagen
(Continued)

FOREIGN PATENT DOCUMENTS

BR PI0801023 11/2009
CN 103312230 A * 9/2013
(Continued)

OTHER PUBLICATIONS

International Search Report of PCT/IL2019/050084 Completed May 7, 2019; dated May 7, 2019 2 Pages.
(Continued)

*Primary Examiner* — Edgardo San Martin
(74) *Attorney, Agent, or Firm* — The Roy Gross Law Firm, LLC; Roy Gross

(57) ABSTRACT

Described hereafter is a device for the conversion of electromagnetic momentum into mechanical momentum to be used in airless environment. The device is built from rotating disk, made of non-magnetic material, on the circumference of which plurality of bar magnets are mounted. The bar magnets are in a plane which is perpendicular to the plane of the disk and in a plane, which is perpendicular to the radius of the disk that meets the centre of the bar magnet. The disk is driven by a motor that causes it to rotate. The magnets are positioned in an angle relative to the rotation axis of the disk. When the disk rotates, mechanical momentum, perpendicular to the plane of the rotating disk is generated. This momentum acts on the disk and causes it to move along the axis of rotation of the disk.

10 Claims, 4 Drawing Sheets

(56) References Cited

U.S. PATENT DOCUMENTS

| | | | | |
|---|---|---|---|---|
| 10,513,353 B2* | 12/2019 | Purvis | ...................... | H01F 7/20 |
| 11,088,608 B2* | 8/2021 | Kaul | ...................... | H02K 53/00 |
| 11,309,753 B2* | 4/2022 | Kaul | ...................... | H02K 16/005 |
| 11,411,483 B2* | 8/2022 | May | ...................... | H01F 7/064 |
| 2012/0280588 A1* | 11/2012 | Bryson | ................... | H02K 53/00 |
| | | | | 74/DIG. 9 |
| 2013/0149152 A1* | 6/2013 | Huss | ...................... | H02K 53/00 |
| | | | | 310/152 |
| 2015/0260168 A1* | 9/2015 | Geneste | ................... | F03G 7/06 |
| | | | | 310/74 |
| 2021/0074461 A1* | 3/2021 | Lagutin | ................... | H01F 7/14 |
| 2021/0159005 A1* | 5/2021 | Purvis | ................... | H01G 11/32 |
| 2022/0037971 A1* | 2/2022 | Tavarez | ................... | H02K 1/17 |
| 2023/0148291 A1* | 5/2023 | Tavarez | ................... | H02K 1/27 |
| | | | | 310/46 |

FOREIGN PATENT DOCUMENTS

| | | | | |
|---|---|---|---|---|
| CN | 203423637 U | * | 2/2014 | |
| CN | 113794395 A | * | 12/2021 | |
| GB | 2537119 | | 10/2016 | |
| IL | 20043509 | | 11/2013 | |
| JP | 2004032968 A | * | 1/2004 | |
| JP | 2005073312 A | * | 3/2005 | |
| KR | 20080106611 A | * | 12/2008 | |
| RO | 131299 A2 | * | 7/2016 | |
| RU | 2172865 | | 8/2001 | |
| WO | 03064257 | | 8/2003 | |
| WO | 2017062881 | | 4/2017 | |
| WO | WO-2017070106 A1 | * | 4/2017 | |

OTHER PUBLICATIONS

Written Opinion of PCT/IL2019/050084 Completed May 7, 2019; dated May 7, 2019 4 Pages.

* cited by examiner

DEVICE FOR CONVERTING ELECTROMAGNETIC MOMENTUM TO MECHANICAL MOMENTUM

CROSS REFERENCE TO RELATED APPLICATION

This application is a National Phase application of International Application No. PCT/IL2019/050084 entitled "DEVICE FOR CONVERTING ELECTROMAGNETIC MOMENTUM TO MECHANICAL MOMENTUM" filed Jan. 22, 2019, the contents of which are incorporated herein by reference.

TECHNICAL FIELD

The present invention relates in general, to the field of aviation and to a device for propulsion generation for objects flying in air and airless environment, without the use of a jet engine.

BACKGROUND ART

Since the invention of jet engines, no new engines have emerged that are capable of ensuring the movement of a flying objects in an airless environment. This is mainly due to the traditional ban on such movement, imposed by the third law of Newton—the law of conservation of mechanical momentum. However, a more general law of conservation of momentum asserts the constancy of the sum of all the momentums of the system, and this sum include an electromagnetic momentum. This violates Newton's third law, which is equivalent to the law of conservation of a mechanical momentum.

New propulsion devices that have been suggested before, as far as we know, were not implemented. U.S. Pat. No. 1,974,483 "Electrostatic motor" describes a motor based on Biefeld-Brown effect, an effect that has not received a generally accepted explanation to this date.

U.S. Pat. No. 3,120,363, "Flying apparatus" describes a propulsion device based on ion discharge. However, this device cannot operate in the absence of atmosphere.

Russian Patent RU-2172865 "Method of obtaining tractive effort" proposes a method for "ensuring the translational movement of transport, including space vehicles." However, the author himself points out that, in accordance with his theory, the tractive force in the proposed constructions will be very small Israel Patent 200435 by S. Khmelnik "A capacitor engine for an aircraft" describes a device intended for flights in an airless environment. It also implements the Biefeld-Brown effect. The disadvantage of this device is the complexity of the design and the need for a high-voltage generator UK Patent GB 2537119, "Superconducting microwave radiation thruster" describes a system designed for flights in space. This system clearly demonstrates the creation of tractive force due to electrodynamic effects. The disadvantage of this device is an extremely small amount of driving force.

Hence there is a need for high thrust propulsion device that can operate in airless environment.

SUMMARY OF INVENTION

Described hereafter is a device for the conversion of electromagnetic momentum into propulsion mechanical momentum. The device is built from rotating disk, made of non-magnetic material, on the circumference of which plurality of bar magnets are mounted. The bar magnets are in a plane which is perpendicular to the plane of the disk and in a plane which is perpendicular to the radius of the disk that meets the centre of the bar magnet. The disk is driven by a motor that causes it to rotate. The magnets are positioned in an angle, called the shift angle, relative to the rotation axis of the disk. When the disk rotates, mechanical momentum, perpendicular to the plane of the rotating disk is generated. This momentum acts on the disk and causes it to move along the axis of rotation of the disk.

The electromagnetic momentum is generated by the change in the magnetic flux—due to the movements of the magnets. This electromagnetic momentum, in accordance with the law of conservation of momentum appears as a mechanical momentum acting on the device.

There are many configurations for implementing the invention, and a skilled man in the art can select a desired configuration.

It is an objective of the present invention to provide a device for generation of propulsion in airless environment without the use of rocket engines.

SUMMARY OF THE INVENTION

Described hereafter is a device for the conversion of electromagnetic momentum into propulsion mechanical momentum in airless environment. The device is comprised of a disk made of non-magnetic material rotated by a motor. The motor gets its energy from a source, such as electric battery. On the circumference of the disk plurality of bar magnets are mounted. The bar magnets are in a plane which is perpendicular to the plane of the disk and in a plane, which is perpendicular to the radius of the disk that meets the centre of the bar magnet. The magnets are positioned in an angle, called the shift angle, relative to the rotation axis of the disk. When the disk rotates, mechanical momentum, perpendicular to the plane of the rotating disk is generated. This momentum acts on the disk and causes it to move along the axis of rotation of the disk.

The electromagnetic momentum is generated by the change in the magnetic flux—due to the movements of the magnets. This electromagnetic momentum, in accordance with the law of conservation of momentum appears as a mechanical momentum acting on the device.

There are many configurations for implementing the invention, and a skilled man in the art can select a desired configuration.

DETAILED DESCRIPTION

The invention will be described more fully hereinafter, with reference to the accompanying drawings, in which certain possible embodiments of the invention are shown.

The invention may, however, be embodied in many different forms and should not be construed as limited to the embodiments set forth herein; rather these embodiments are provided so that the disclosure will be thorough and complete, and will fully convey the scope of the invention to those skilled in the art.

Figure 1:
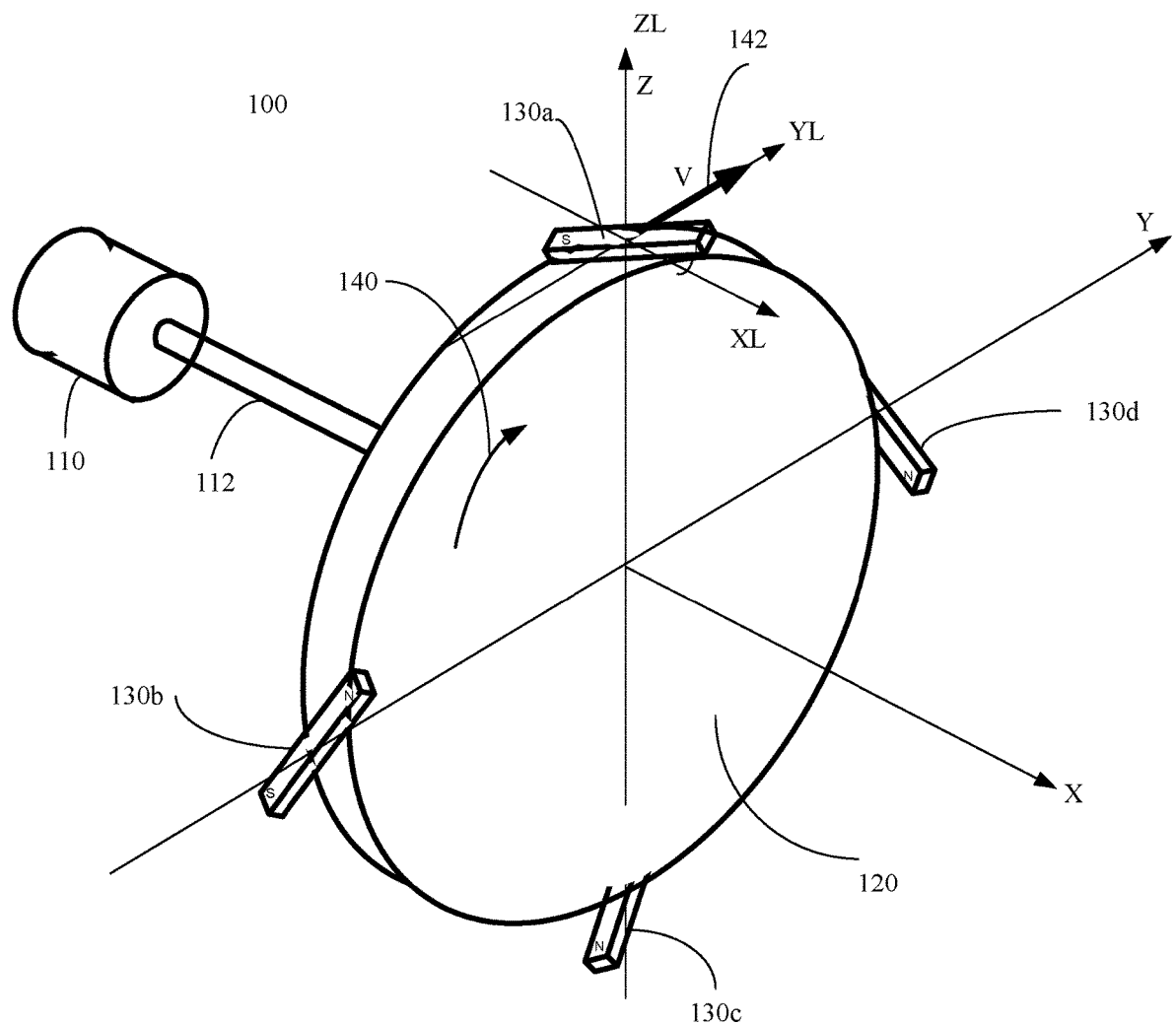
FIG. 1 presents structure of an embodiment of the proposed device.

A general structure of an embodiment of the device is shown in FIG. 1. The device 100 is comprised of a motor 110 driving through a shaft 112, a disk 120 made of non-magnetic material. Plurality of bar magnets are attached on the circumference of the disk 120. The motor is activated by an energy source. In FIG. 1 four bar magnets 130a, 130b, 130c and 130d are shown. Also shown in FIG. 1 are main right-hand coordinate system the center of which is on the center of the rotating disk, X axis coincides with the axis of rotation of the disk 120, the Y axis lies on the plane of the rotating disk 120, and the Z axis forms a right-hand coordinate system. The disk 120 and the magnets rotate, as shown in FIG. 1 in the direction of vector 140. Note that the number of bar magnets and their locations can be selected according to the required performance. The size of the magnets can be selected. As will be shown later different configurations for the bar magnets can be selected, if the principles of operation are met. A second right-hand coordinate system having coordinates XL, YL, ZL which are centered in the center of each bar magnet (the coordinate for bar magnet 130a are shown). The XL axis is parallel to the X axis of the main coordinate system, YL axis coincides with the tangent to the disk pointing in the direction of the velocity vector 142, and the ZL is along the radius line of the disk to the center of the bar magnet, pointing outside the disk 120.

Figure 2:
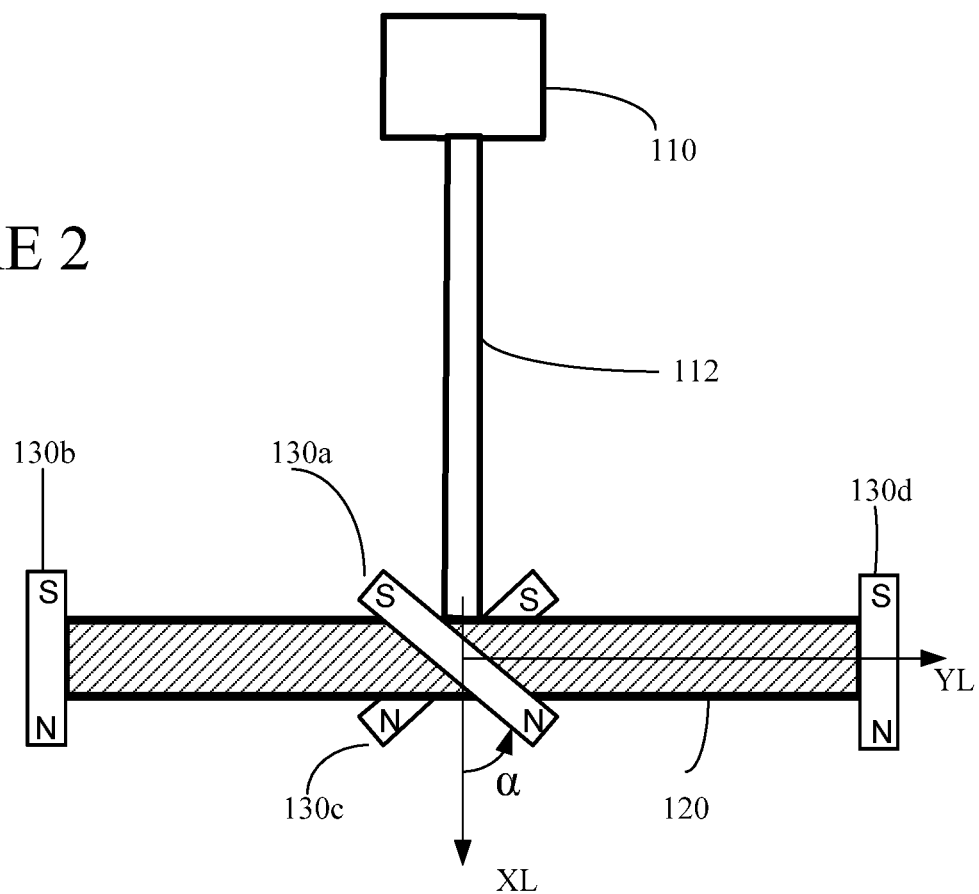
FIG. 2 presents top view of the of the structure presented in FIG. 1.

A top view of the device is presented in FIG. 1 is presented in FIG. 2. The motor 110 is attached to a disk 120 via a shaft 112. Four bar magnets 130a, 130b, 130c and 130d or attached to the circumference if the disk 120. A local right-hand coordinate system the axes of which are XL, YL and ZL is shown. Where its origin coincides with the center of bar magnet 103a. Each bar magnet lies in its XL, YL plane, and its axis forms an angle α with the XL axis—called the shift angle.

Figure 3:
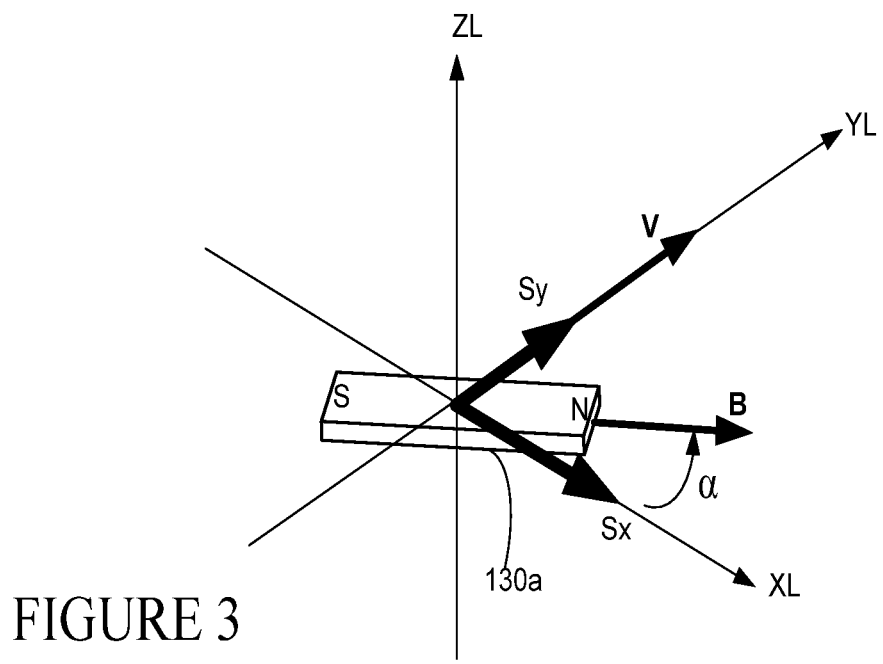
FIG. 3 presents the coordinate system and few vectors.

Explanation of the principle of operation of the device follows. The explanation refers to FIG. 3 which show one magnet and the fields and energy vectors acting on it. We refer to a local right-hand cartesian coordinate system having axes XL, YL and ZL as explained above. The bar magnet 130a with its magnetic poles N, S as shown, lies in the XL, YL plane, and is rotated with an angle α, the shift angle, relative to the XL. When a magnet having magnetic induction, B moves at a velocity V along the YL axis, an electric field E is generated according to equation (1).

$$E = V \times B \qquad (1)$$

The magnetic induction $\underline{B}$ is aligned with the magnetic intensity H-208, and are related by the formula (2):

$$B = \mu \cdot H \text{ where } \mu \text{ is the magnetic permeability.} \qquad (2)$$

The vector of the flux density of electromagnetic energy S is given by the following vector product equation:

$$S = E \times H \qquad (3)$$

Combining (1), (2) and (3) we get:

$$S = \mu(V \times H) \times H \qquad (4)$$

The components of the S, V and H vectors are S=[Sx, Sy, Sz]; V=[Vx, Vy, Vz] and H=[Hx, Hy, Hz], and noting that Vx=Vz=0 and Hz=0, and Hx=|H| cos α; Hy=|H| sin α we can write (4) as follows:

$$\underline{S} = \mu |V| \cdot |H|^2 \cdot Q; \text{ where } Q \text{ is a vector the components of} \qquad (5)$$

which are:

$$Q = [0.5 \sin(2*\alpha), -\cos^2(\alpha), 0] \qquad (6)$$

The density of magnetic energy is given by:

$$W = 0.5 \, \mu H^2 \text{ and inserting (8) into (6) yields:} \qquad (7)$$

$$S = 2 \cdot |V| \cdot W \cdot Q \qquad (8)$$

Figure 4:
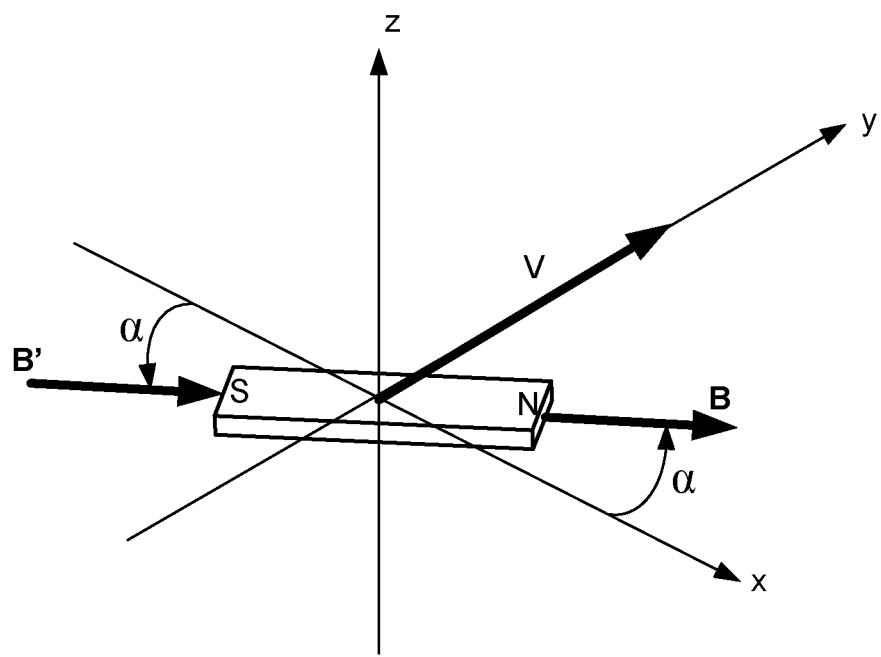
FIG. 4 presents the coordinate system and few vectors with the addition of the field caused by the south pole of the bar magnet.

Note that equation (8) refers only to one end of the bar magnet. When the two magnet ends are taken into consideration, we get that the flux density of electromagnetic energy for the bar magnet $S_m$ equals two times that of one side, i.e. $S_m = 2S$, as shown in FIG. 4. Thus, we get $$Sm = 4 \cdot |V| \cdot Wm \cdot Q \qquad (9)$$

There is the idea in physics of motion of energy, the flow of energy and the velocity of energy motion. In our case the energy flux density s, the energy density w and the energy velocity v are related by the formula:

$$S = w*v \qquad (10)$$

It is known that in electromagnetic fields the velocity of energy motion is much less than the velocity of light. In our case, together with the magnet, the electromagnetic energy stored in it is transferred. The motion of this energy also creates a stream of electromagnetic energy, discussed above. This energy moves at a certain velocity Vs. In our case, formula (9) takes the form:

$$Sm = Wm*Vs \qquad (11)$$

Comparing equations (9) and (11) we get that $$Vs = 4 \cdot |V| \cdot Q \qquad (12)$$

So that Vs has two components, one directed along YL axis and the other along the XL axis.

It is known that the electromagnetic fields in which electromagnetic energy flow exists, also contain fluxes of the electromagnetic momentum, and the electromagnetic momentum and the mechanical momentum enter the law of conservation of momentum in an equal manner. At the same time, the density of the electromagnetic momentum J and the flux density of an electromagnetic energy Sm are related by a relation having the form:

$$J = Sm/Vs^2 \qquad (13)$$

Combining (11) and (13) we can write:

$$J = Wm/Vs = Wm/(|V| \cdot 4 \cdot Q) \qquad (14)$$

We can define Q'=1/(4·Q)={0.5/(sin (2α)), −1/(4 cos²(α)), 0}

So that (14) can be written as:

$$J = [Wm/(|V|)] \cdot Q' \qquad (15)$$

The density vector of the electromagnetic momentum is directed in the same way as the vector of the flux density of the electromagnetic energy. In accordance with the law of conservation of momentum, the electromagnetic momentum, together with the mechanical momentum of the magnet must be zero, since at the beginning of the motion the latter was absent. Consequently, the body of the magnet acquires a mechanical momentum.

$$Jm = -J \cdot M \text{ where } M \text{ is the volume of the magnet.} \quad (16)$$

Hence, Jm has a component in the direction of −XL which exerts on the rotating disk force which is perpendicular to its rotation plane.

Figure 5:
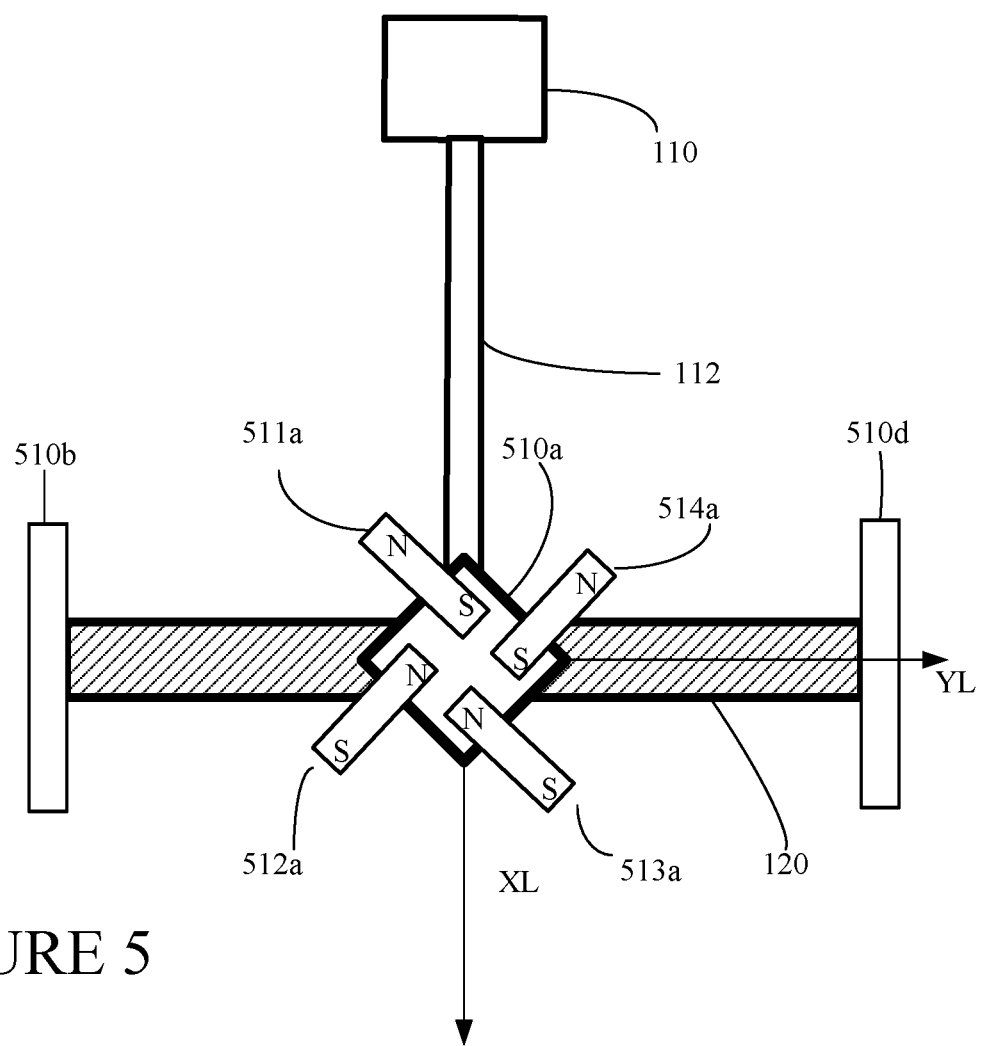
FIG. 5 shows a variation of the magnet placement on the disk.

As noted earlier, the magnets on the disk can be arranged in many different configurations. One such configuration is shown in FIG. 5, which presents top view of the device with the magnet array replacing magnet 130a in FIG. 3. The magnet array is comprised of an array platform 510a made of non-magnetic material on which four bar magnets 511a, 512a, 513a and 514a are mounted. Note that the north pole of all four magnets points in the same direction relative to the south pole. Also shown in the FIG. 5 are magnet arrays 510b and 510d.

In another embodiment a control unit is added, where it can control the speed of the motor. In another embodiment a control unit can control the shift angle which is the angle between the bar magnet and the XL axis so control the propulsion.

What has been described above are just a few possible embodiments of the disclosed invention. It is of course, not possible to describe every conceivable combination of components and/or methodology, but one of ordinary skill in the art may recognize that many further combinations and permutations are possible. Accordingly, the invention is intended to embrace all such alterations, modifications, and variations that fall within the spirit and scope of the invention.

What is claimed is:

1. A device for the conversion of electromagnetic momentum into mechanical momentum, the device is comprised of:
   a. energy source;
   b. a motor;
   c. a disk made from non-magnetic material attached to the motor by a shaft; and
   d. plurality of bar magnets mounted on the circumference, where each magnet lies in a plane perpendicular to the plane of the disk, and it is in the plane which is perpendicular to the radius of the disk, the radius extending from the disk centre to the centre of the bar magnet, and the bar magnet has an angle, the shift angle, relative to the axis of rotation of the disk.

2. The device for the conversion of electromagnetic momentum into mechanical momentum, as in claim 1, where the energy source is electric source.

3. The device for the conversion of electromagnetic momentum into mechanical momentum, as in claim 1, where the shift angle of all magnetic bars is equal.

4. The device for the conversion of electromagnetic momentum into mechanical momentum, as in claim 1, where each bar magnet can be replaced by array of bar magnets lying in the same plane as the replace bar magnet.

5. The device for the conversion of electromagnetic momentum into mechanical momentum, as in claim 1 which includes a control unit that can control the speed of the motor.

6. The device for the conversion of electromagnetic momentum into mechanical momentum, as in claim 1, where the shift angle of the bar magnets can be changed.

7. The device for the conversion of electromagnetic momentum into mechanical momentum, as in claim 5, which includes a control unit for controlling the shift angle.

8. The device for the conversion of electromagnetic momentum into mechanical momentum, as in claim 1, where the bar magnets are permanent magnets.

9. The device for the conversion of electromagnetic momentum into mechanical momentum, as in claim 1, where the bar magnets are electro magnets.

10. The device for the conversion of electromagnetic momentum into mechanical momentum, as in claim 8, where the strength of the magnets can be controlled by a control unit.

* * * * *